（12）United States Patent
Salzgeber

(10) Patent No.: US 11,193,814 B2
(45) Date of Patent: Dec. 7, 2021

(54) DEVICE AND METHOD FOR IDENTIFYING OBSTACLES FOR RAIL VEHICLES

(71) Applicant: Siemens AG Oesterreich, Vienna (AT)

(72) Inventor: Gerard Salzgeber, Graz (AT)

(73) Assignee: SIEMENS MOBILITY AUSTRIA GMBH, Vienna (AT)

( * ) Notice: Subject to any disclaimer, the term of this patent is extended or adjusted under 35 U.S.C. 154(b) by 869 days.

(21) Appl. No.: 15/124,525

(22) PCT Filed: Feb. 25, 2015

(86) PCT No.: PCT/EP2015/053941
§ 371 (c)(1),
(2) Date: Sep. 8, 2016

(87) PCT Pub. No.: WO2015/135753
PCT Pub. Date: Sep. 17, 2015

(65) Prior Publication Data
US 2017/0016758 A1    Jan. 19, 2017

(30) Foreign Application Priority Data

Mar. 12, 2014 (AT) .............. A50181/2014

(51) Int. Cl.
*G01G 19/08* (2006.01)
*B61L 23/04* (2006.01)
(Continued)

(52) U.S. Cl.
CPC .............. *G01G 19/08* (2013.01); *B61L 23/00* (2013.01); *B61L 23/041* (2013.01);
(Continued)

(58) Field of Classification Search
CPC ...... B61L 23/041; B61L 23/00; B61L 25/021; G01L 5/0052; G01G 9/00; G01G 19/08
(Continued)

(56) References Cited

U.S. PATENT DOCUMENTS 6,561,301 B1    5/2003  Hattori et al.
2002/0065591 A1 *  5/2002  Schubert .............. B60R 21/013
                                                            701/38
(Continued)

FOREIGN PATENT DOCUMENTS

CN            2482524       3/2002
CN           102227339     10/2011
(Continued)

OTHER PUBLICATIONS

Kurtus, Pressure is Force per Unit Area, Mar. 18, 2006, School for Champions, pp. all, (Year: 2006).*
(Continued)

*Primary Examiner* — Paul D Lee
(74) *Attorney, Agent, or Firm* — Cozen O'Connor

(57) ABSTRACT

A device for identifying obstacles for rail vehicles includes a force measuring device that generates a collision force measuring signal in the event of a collision between a collision beam of the rail vehicle and a mass of the collision object, where the collision force measuring signal is directed to an evaluation device together with a rail vehicle speed signal and the evaluation device is configured to integrate the collision force measuring signal via an integrator located in the evaluation device and by using the rail vehicle speed signal in order to determine the mass of the collision object.

20 Claims, 4 Drawing Sheets

(51) Int. Cl.
  *B61L 23/00* (2006.01)
  *B61L 25/02* (2006.01)
  *G01G 9/00* (2006.01)
  *G01L 5/00* (2006.01)

(52) U.S. Cl.
  CPC .............. *B61L 25/021* (2013.01); *G01G 9/00* (2013.01); *G01L 5/0052* (2013.01)

(58) Field of Classification Search
  USPC ......................................................... 702/173
  See application file for complete search history.

(56) References Cited

U.S. PATENT DOCUMENTS

| | | | |
|---|---|---|---|
| 2004/0177691 A1* | 9/2004 | Kunda | G01D 3/032 73/514.35 |
| 2007/0164574 A1 | 7/2007 | Tanabe | |
| 2008/0098821 A1* | 5/2008 | Tanabe | B60R 21/0136 73/775 |
| 2008/0136613 A1* | 6/2008 | Takafuji | B60R 21/0136 340/436 |
| 2008/0201077 A1* | 8/2008 | Tanabe | B60R 21/0136 701/301 |
| 2009/0050394 A1* | 2/2009 | Takahashi | B60R 21/0134 180/274 |
| 2009/0312949 A1 | 12/2009 | Suzuki et al. | |
| 2010/0318265 A1* | 12/2010 | Yamashita | B60R 21/0133 701/45 |
| 2011/0232396 A1 | 9/2011 | Takahashi et al. | |
| 2012/0029814 A1* | 2/2012 | Mase | B60R 19/18 701/301 |

FOREIGN PATENT DOCUMENTS

| | | | |
|---|---|---|---|
| DE | 102 61 859 | | 7/2004 |
| DE | 103 21 209 | | 12/2004 |
| DE | 112005001941 A5 | | 4/2008 |
| EP | 1 637 405 | | 3/2006 |
| EP | 2383152 | | 11/2011 |
| EP | 2 548 783 | | 1/2013 |
| GB | 2 396 942 | | 7/2004 |
| WO | WO 2004/058545 | | 7/2004 |
| WO | WO 2004/065163 | | 8/2004 |
| WO | WO 2008/122547 | | 10/2008 |
| WO | WO-2012125106 A1 * | 9/2012 | ............ B60W 30/09 |

OTHER PUBLICATIONS

Carl, et al., "Kollisionssichere Lokomotiven—Spezifische Anforderungen Und Deren Praktische Umsetzung Am Beispiel Der Lokomotivfamilie Traxx On Bombardier"—"Locomotives—Transportation//Crashworthy Special Requirements And Their Practical Application On Example Of The Traxx On Bombardier Locomotive Family", Zevrail-Glasers Annalen, Georg Siemens Verlag, 2004, pp. 398-417, vol. 128, No. 9.
XP-002712019 für Fahrerassistenzsysteme, Sensorik, Matthias Mörbe.
Notice of Decision dated Feb. 2, 2020 issued in United Arab Emirates Patent Application No. 6000179/2016.
Office Action dated Apr. 17, 2017 which issued in the corresponding Chinese Patent Application No. 201580013458.3.
Office Action dated Feb. 22, 2021 issued in European Patent Application No. 15707901.3.

* cited by examiner

DEVICE AND METHOD FOR IDENTIFYING OBSTACLES FOR RAIL VEHICLES

CROSS-REFERENCE TO RELATED APPLICATIONS

This is a U.S. national stage of application No. PCT/EP2015/053941 filed 25 Feb. 2015. Priority is claimed on Austrian Application No. A50181/2014 filed 12 Mar. 2014, the content of which is incorporated herein by reference in its entirety.

BACKGROUND OF THE INVENTION

1. Field of the Invention

The invention relates to a device and a method for detecting obstacles for rail vehicles, comprising a force measuring device for producing a collision force measurement signal in the event of a collision between a collision beam of a rail vehicle and a mass of a collision object.

2. Description of the Related

A foreign object on a railroad track can pose a significant hazard in the event of a collision. Rail guards or (pilots) with which an obstacle can be cleared from the line have therefore long been employed in railroad systems. Such a pilot usually consists of a steel structure having a collision beam that is set at right angles to the direction of travel. The collision beam is fixed to the main frame of the rail vehicle or to the truck frame by a mounting bracket. Such a pilot is usually positioned in front of the leading wheelset and as closely as possible to the top of the rail.

For example, EP 2 548 783 A2 discloses a collision detection system for a vehicle, where a collision unit is retained in a predefined position by a shear pin. Particular reactions in the vehicle (e.g., signaling to the driver and/or automatic brake application) only occur if a predefinable collision intensity is exceeded. Smaller or lighter obstacles are not registered.

The disadvantage of such conventional systems is that the mass of the collision object cannot be accurately gauged. Another disadvantage is that vibrations occurring as the running speed increases can result in unintended initiation of braking.

Presently, however, a frequent requirement placed on rail vehicles is that emergency braking shall always be reliably initiated if the mass of the obstacle is greater than a particular limit value. A typical limit value is, for example, a foreign object having a mass of more than 5 kg resting on the track. A smaller obstacle should not trigger braking, but possibly cause an appropriate message indicating the mass of the collision object to be sent the driver.

SUMMARY OF THE INVENTION

In view of the foregoing, it is an object of the present invention to provide a method and a device for detecting obstacles for rail vehicles such that a reliable assessment of the mass of an obstacle involved in a collision can be achieved as simply as possible.

This and other objects and advantages are achieved by a device and method by which the mass of a foreign object involved in a collision can be advantageously determined by determining the impulse occurring in the event of a collision between an obstacle and a collision beam. The underlying approach here is therefore based on the conservation of linear momentum. Accordingly, a given impulse having an arbitrary force-time characteristic that is exerted on a free mass (obstacle) results in an equivalent increase in momentum of this mass. If this mass, i.e., the obstacle, is at rest prior to the collision, it is accelerated to at least the running speed. The change in momentum corresponds to the time integral of the collision force characteristic, i.e., the force-time surface. If this force-time surface in the form a collision signal is known, the desired collision mass can be easily determined, for example, by dividing the value of the force-time surface by the running speed.

The device in accordance with the invention is therefore configured such that the collision force measurement signal is fed together with a rail vehicle speed signal to an evaluation device, and the evaluation device is configured to integrate the collision force measurement signal via an integrator and to determine the mass of the collision object from the change in this integral using the rail vehicle speed signal.

The device in accordance with the invention enables the mass involved in the collision to be quantified on-board. The mass involved when a collision occurs is therefore known to the rail vehicle. The advantage of this is that particular reactions can be initiated depending on the severity of the collision. In the case of a light-weight obstacle, for example, which can easily be cleared away by the pilot, an indication can be provided for the rail vehicle driver. On the other hand, if the event of a severe collision for which the mass involved exceeds a predefined limit value, such as a mass greater than 5 kg, the reaction in the rail vehicle can be to initiate braking, or even emergency braking.

Advantageously, the determination of the mass is performed via a conservation of linear momentum for a rail vehicle speed signal, a signal value of which is greater than a predefinable speed threshold value.

As it is not the instantaneous value of a force but its integral that is evaluated, the robustness of the system is increased. This is particularly advantageous especially at greater speeds. At higher running speeds, truck motions in the direction of travel have been found to increase. Truck vibrations can occur which, in the case of known collision detecting devices, cause undesirable false alarms or trigger unwanted brake applications.

Another advantage is that only a comparatively low degree of technical complexity is required for implementing the invention. Standardized electronic components such as digital processors and digital filters and other commercially available integrated digital devices such as electronic integrators can largely be used. The manufacturing costs are therefore comparatively low.

It can be advantageous for the integration to be a time-limited integration over time, the integration time of which corresponds approximately to the impact duration.

It may be computationally advantageous if the integrator is a block integrator having constant or non-constant coefficients. This achieves a high-pass effect for signal processing and the integration is simultaneously performed only in the time window considered, i.e., between the start and end of the collision. As a result, constant components, such as snow lying on the track, are not evaluated in terms of signals.

By using a block integrator with non-constant coefficients (implementation as FIR filter), the boundary effects of the block integrator with constant coefficients can be reduced and, in addition, another low-pass effect can be introduced, by which, along with the integrative effect, it also acts as a decimation filter. This enables computing power to be reduced.

As an alternative to the block integrator which can be implemented as a FIR filter, a recursive implementation of the infinite integrator via an IIR filter could also be used. As the recursive integrator has no high-pass filter effect, the constant components are removed by an additional high-pass filter. This implementation is advantageous in the case of processor systems having little main memory as, in contrast to the FIR filter, no input data needs to be temporarily stored.

In order to prevent height changes caused by compression of the primary spring, it may be advantageous for the force measuring device to be disposed in the collision force flow between the collision beam and an axle box of the rail vehicle. However, a comparatively simpler configuration is also alternatively possible in which the force measuring device is linked directly into the force flow between the pilot and truck frame.

It is also an object of the invention to provide a method of obstacle detection for a rail vehicle, where a collision force measurement signal is fed together with a rail vehicle speed signal to an evaluation device, and the evaluation device integrates the collision force measurement signal via an integrator and determines the mass (m) of a collision object using the rail vehicle speed signal.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

For further explanation of the invention, reference will be made in the following section of the description to drawings in which further advantageous embodiments, effects and variants of the invention will be explained in greater detail on the basis of non-limiting examples, in which.

DETAILED DESCRIPTION OF THE EXEMPLARY EMBODIMENTS

Figure 1:
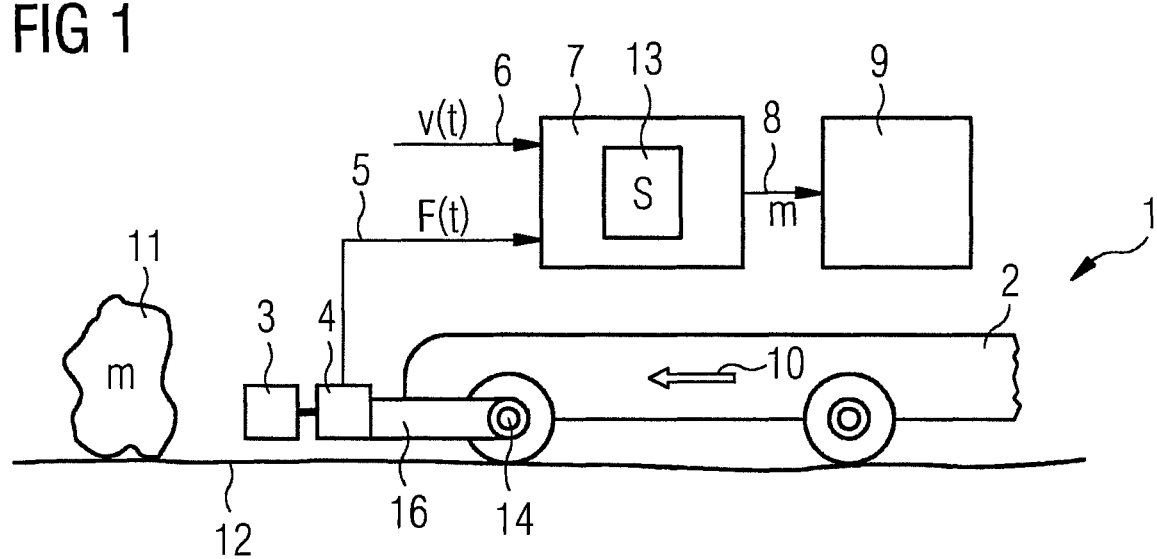
FIG. 1 schematically illustrates an exemplary embodiment of the invention in a block diagram showing how the mass of a collision object is determined, where a collision force signal and a speed signal are fed to a signal processing and evaluation device located on board a rail vehicle.

FIG. 1 schematically illustrates a first exemplary embodiment of the invention. Indicated by the reference character 1 in FIG. 1 is a rail vehicle, not shown in greater detail, which is moving along the track 12 in the direction of the arrow 10. The rail vehicle 1 is approaching an obstacle 11 lying on the track 12. This obstacle 11 is assumed to be at rest and to have mass m. Located at the front of the rail vehicle 1 is a collision beam 3, hereinafter also referred to as the pilot. If a collision occurs between the pilot 3 of the rail vehicle 1 and the obstacle 11, the mass m is accelerated to at least the vehicle speed, but to no more than twice the vehicle speed. The pilot 3 is subject to a collision force F. This collision force F is measured via a force measuring device 4 that is disposed in the force flow between the pilot 3 and a mounting bracket 16 mounted on the axle box 14. This time-dependent collision force measurement signal 5, hereinafter also referred to as the force signal F(t), is fed together with a speed signal 6 to an on-board signal processing and evaluation device 7, hereinafter also referred to the evaluation device 7. The evaluation device 7 contains an integration device 13. This integration device 13 performs time-limited integration of the force signal F(t). The impulse is determined by integration of the force signal F(t) within the integration limits ta and tb. The two integration limits ta and tb denote the start and end of the collision respectively. As already stated, it is assumed that the obstacle 11 was at rest prior to the collision d and moves at the vehicle speed after the collision.

The functionality of the integration can be implemented electronically in different ways, a suitable option being, for example, time-limited integration via a per se known block integrator. Digital filters such as per se known IIR and/or FIR filters, can also be used in the evaluation device for this purpose.

In accordance with the invention, it is not therefore a force or a force characteristic that is used as the criterion for obstacle detection but the integral of the force occurring during the collision. The impulse caused by the collision depends only on the object mass m and the change in the object speed. The underlying concept of the invention is that a given impulse having an arbitrary force characteristic that is applied to a (free) mass results in an equivalent increase in momentum of that mass. For the present application as obstacle detection, this relationship is interpreted such that an object that is accelerated from rest to vehicle speed applies a defined impulse to the pilot 3. The magnitude of this impulse corresponds to the object mass m multiplied by the change in speed of the object.

The surface between the time axis and the instantaneous characteristic of the force signal F(t) corresponds to the change in momentum of the initially at rest collision mass m. The collision mass m is calculated by dividing the time integral of the force characteristic by the speed of the rail vehicle. Basically, the determination of the mass is independent of the time within which the impact occurs.

The computation result is represented in the block diagram in FIG. 1 by the collision mass signal 8. The signal 8 represents the mass of the obstacle and is fed to a control device 9 that decides, possibly by comparison with a pre-defined mass threshold value, how the collision is to be interpreted, i.e., whether the mass m at impact may be deemed small enough merely to generate an indication for the driver, or whether it has exceeded the predefined threshold value so that a brake application or more specifically emergency braking of the rail vehicle must be initiated.

In other words, in accordance with the objects of the invention it is not the (limit) value of a force per se but the integral of a force that is therefore evaluated as a criterion for an indication or braking as the case may be. This makes it possible to quantify the collision mass. This in turn enables obstacles to be detected in a differentiated manner. As a result, the requirements that are nowadays placed on rail vehicles can be better met: a collision with an obstacle shall also be quantified so as to provide a better assessment of the damage caused.

Another advantage is the greater robustness of the electronic obstacle detection: the risk of a false alarm which can be caused, for example, by a motion or more specifically oscillation of the truck in the direction of travel is less, because of the evaluation of the force integral.

Figure 2:
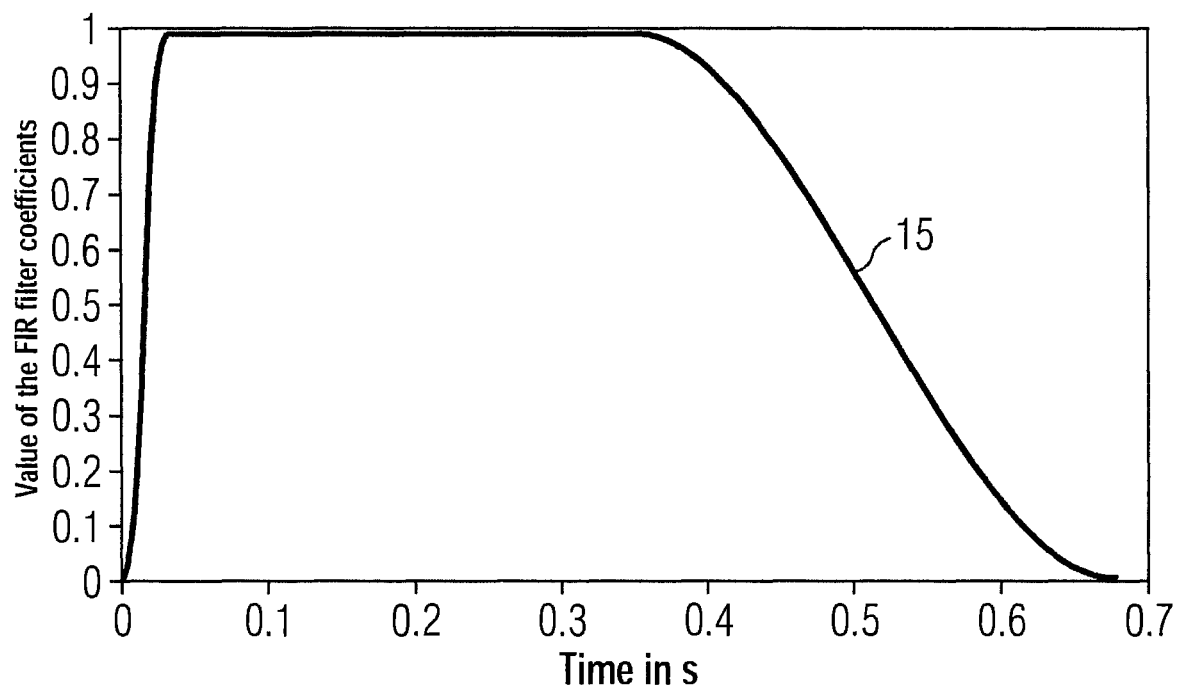
FIG. 2 shows FIR filter coefficients of a block integrator as a function of the integration time, where the block integrator is preferably suitable for calculating the impulse and subsequently the mass of the collision object in the signal processing and evaluation device.

FIG. 2 shows an exemplary integration function of an integrator 13 used in the electronic signal processing 7. A time-limited integrator is preferably used, the integration time of which corresponds approximately to the expected impact duration. The integrator used in the illustrated example is a "block integrator". In FIG. 2, the integration time in seconds s is plotted on the abscissa and the value of the FIR filter coefficients is plotted on the ordinate. The integration function 15 is not a rectangular window but a modified rectangular window that is "rounded off" at the "start" and "end" using a Harming function, in each case. In the example shown, the mean integration time of this modified block integrator has been selected at 0.5 seconds, on the assumption that the collision with the object is complete after 0.5 s.

In this example, a high-pass filter having a cutoff frequency of approximately 1 Hz is additionally connected upstream to reduce effects caused by low-frequency motions.

Using a high-pass filter of this kind, it is possible to reduce interfering effects caused by motions in the direction of travel (X-direction). The high-pass filter characteristic ensures that a constant force acting on the pilot, such as snow lying on the track, is not evaluated for electronic obstacle detection.

The signal-to-noise ratio between the wanted signal corresponding to the impulse occurring in the event of a collision and the noise occurring as a result of the frame motion during running of the rail vehicle will now be described on the basis of operational measurements.

Figure 3:
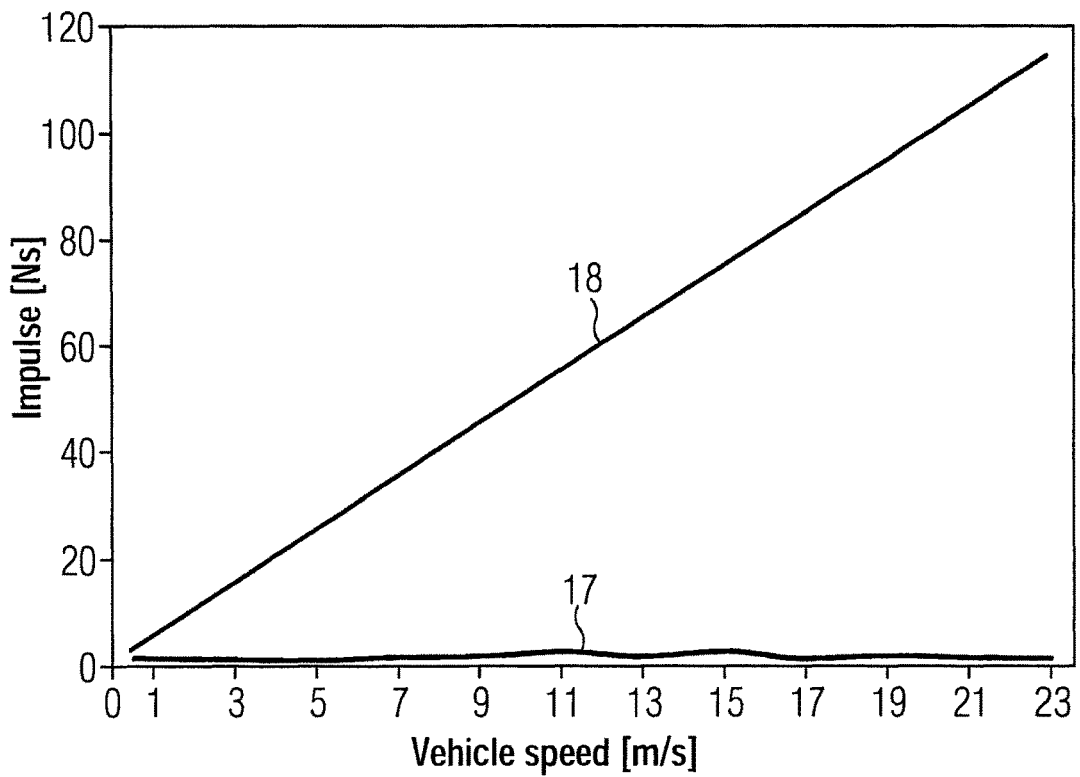
FIG. 3 shows a graphical plot of the speed-dependent signal-to-noise ratio, where curve 18 shows the calculated impulse in the event of collision with a 5 kg object as a function of the speed, and the friction is not taken into account, and where curve 17 shows the likely impulse during normal operation (running of the rail vehicle without collision), calculated from the frame acceleration and the beam mass of 10 kg, and where the frame acceleration values are values actually measured during operation.
Figure 4:
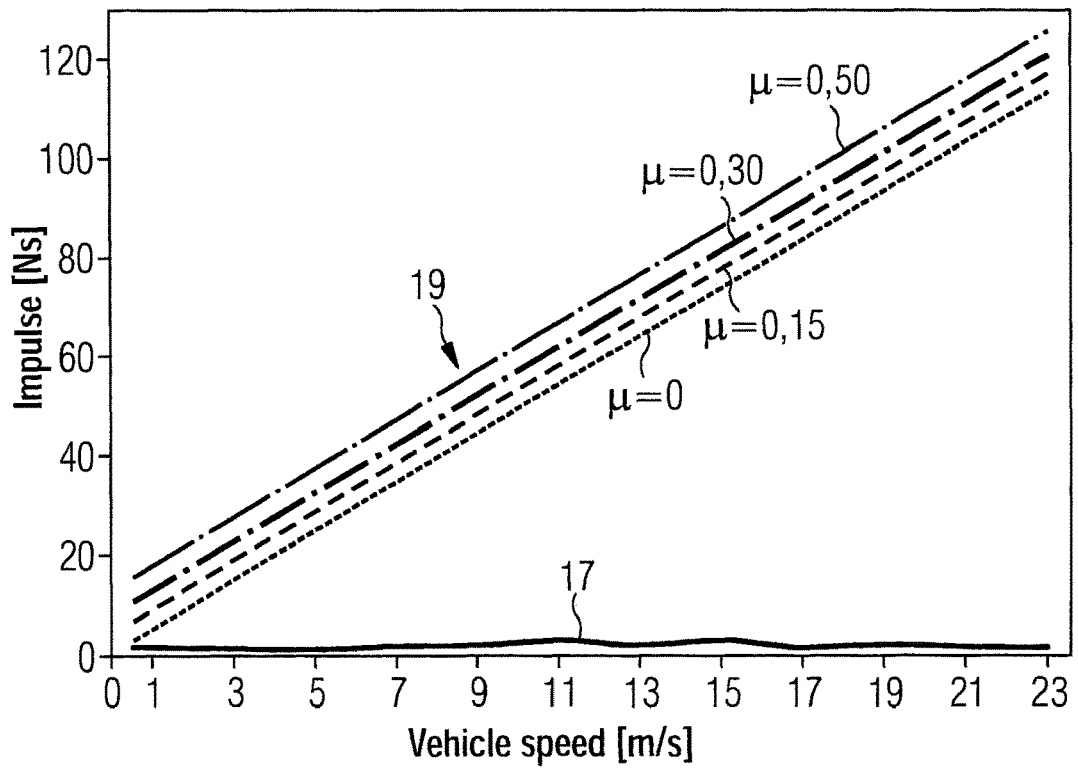
FIG. 4 shows a graphical plot of the speed-dependent signal-to-noise ratio, where the impulse from the friction of a 5 kg object with the track is added to the impulse from the collision with the 5 kg object, resulting in an increase in the signal-to-noise ratio at low speeds.

The following graphs in FIG. 3 and FIG. 4 each show, on the abscissa, the speed in meters per second (m/s) and, on the ordinate, the impulse in Newton seconds (Ns). In both graphs, a mass of 10 kg is assumed for the pilot and a mass of 5 kg for the obstacle.

In the first graph (FIG. 3), the friction is not taken into account. The curve 17 shows the noise level (integrated acceleration multiplied by beam mass 10 kg) occurring during normal operation (collision-free running of the rail vehicle), where the acceleration values required for calculating the noise level come from operational measurements. The curves 18 (FIG. 3) and 19 (FIG. 4) show the calculated impulse value (plastic impact), measured in Ns, as a function of the vehicle speed; the collision mass is 5 kg. As may be seen from curve 18 (FIG. 3), the impulse 18 arising from a collision increases linearly with the speed. At a speed of less than 0.5 m/s, evaluation is virtually impossible, because the signal-to-noise ratio is too low, i.e., the noise component caused by the frame acceleration is then no longer negligible compared to the collision impulse. However, from a speed of 1 m/s onwards, the ratio with respect to this noise level increases linearly, so that here, from approximately 1 Ns, the impulse is sufficiently far from the value of the noise level. Therefore, (disregarding the friction component) from a speed of about 1 m/s onwards, a sufficiently accurate estimate of the mass m of the obstacle 11 is possible.

In the second graph (FIG. 4), the friction in the form of sliding friction is taken into account for different friction coefficients μ. The following values have been assumed here: $\mu=0$, $\mu=0.15$, $\mu=0.3$, $\mu=0.5$. As evident from the graph in FIG. 4, frictional effects become increasingly noticeable below 3 m/s. From a speed of approximately 3 m/s onwards, the impact component of the mass acceleration predominates so that, from this speed onwards, in the event of a collision between the pilot and an obstacle at rest, the friction can be disregarded and a sufficiently accurate assessment of the mass of the collision object is possible. However, at low speeds this friction must be taken into account using a selected "average" friction coefficient.

Comparing the two graphs (FIG. 3 and FIG. 4), it can be stated that, from a speed of approximately 2 m/s onwards, the mass m of a collision object 11 can be sufficiently accurately gauged via the electronic obstacle detection in accordance with invention. At higher speeds, the effect of friction can be virtually disregarded.

At speeds of below approximately 1 m/s, although it is difficult to estimate the mass of the collision object in terms of the conservation of linear momentum, it is possible here, even at low running speeds, to make an estimate of the collision mass via the speed-invariant friction that likewise produces an impulse. However, as the frictional force is directly dependent on the friction coefficient, a comparatively large estimation error is likely here.

It should be recognized that, force sensors do not necessarily have to be used as sensors 20 for measuring the force. It is also possible to determine the force characteristic of the collision indirectly via the bending of a beam or spring. In this case, a position change proportional to the force is measured. Sensors suitable for measuring displacement can be, for example, conventional strain gages on a bending beam, or inductive or optical distance sensors, or a wire potentiometer or even speed/acceleration sensors in conjunction with single or double integration. These sensors can be placed on a spring element, such as a leaf spring, which is bent on impact.

The collision beam 3 can be fixed to the rail vehicle 1 in different ways: the pilot 3 can be mounted to the frame of the truck 2 and/or to the axle-box case 14.

Figure 5:
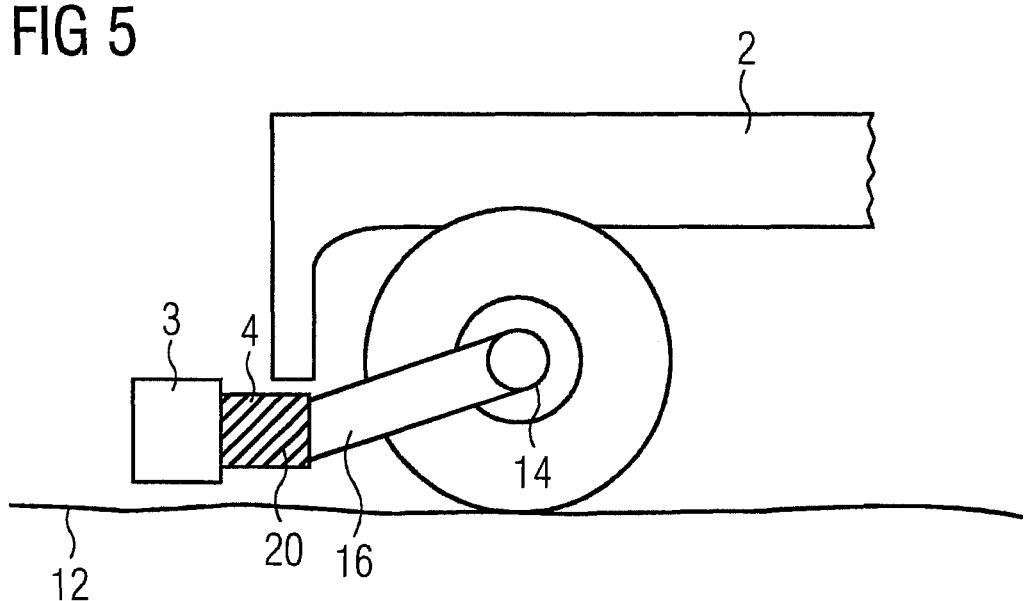
FIG. 5 schematically illustrates the mounting of the force measuring device in the force flow between a pilot and an axle box.

FIG. 5 shows an arrangement in which sensors 20 of the force measuring device 4 are disposed in the force flow between the pilot 3 and a mounting bracket 16 that is fixed to the axle box 14. The advantage of this arrangement is that height changes of the truck frame 2 have no effect.

Figure 6:
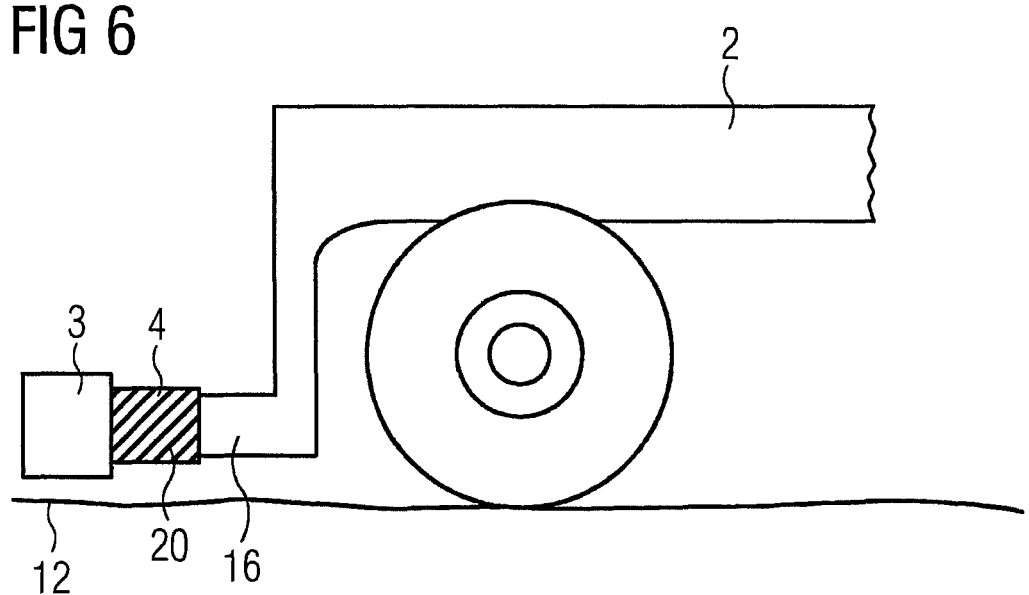
FIG. 6 schematically illustrates the mounting of the force measuring device in the force flow between pilot and truck frame.

FIG. 6 shows an alternative arrangement in which sensors 20 of the force measuring device 4 are disposed in the force flow between the pilot 3 and a mounting bracket 16 fixed to the truck frame 2.

Various devices are possible as sensors 20 or force transducers, such as a load cell, or an indirect method of measurement in which a position signal is used [ ... ] which is converted into a force signal.

Although the invention has been illustrated and described in detail by the exemplary embodiments presented as preferred in the above, the invention is not limited by the examples disclosed. Other variations may be inferred therefrom by those skilled in the art without departing from the scope of protection sought for the invention.

Figure 7:
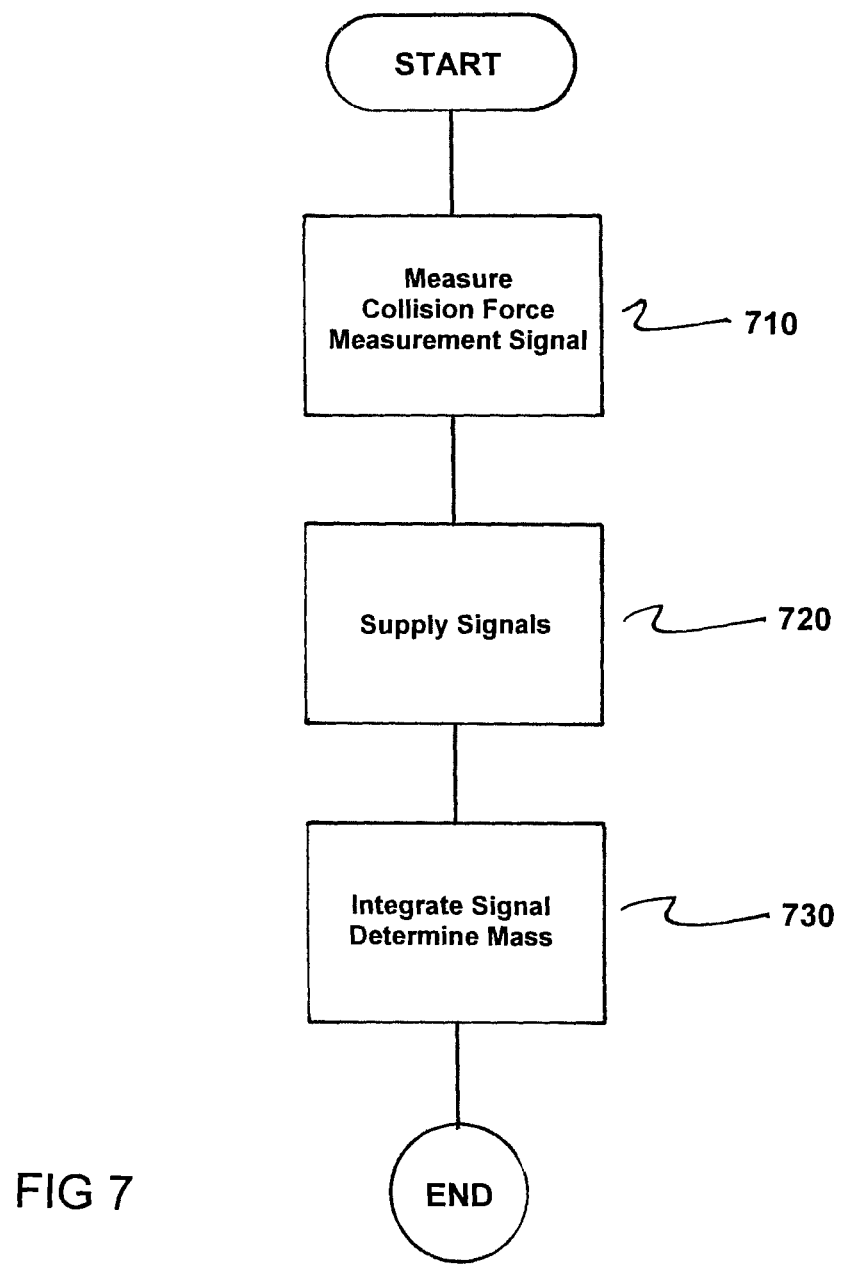
FIG. 7 is a flowchart of the method in accordance with the invention.

FIG. 7 is a flowchart of a method for detecting obstacles for a rail vehicle (1). The method comprises measuring a collision force measurement signal (5) is via a force measuring device (4) in an event of a collision between a collision beam (3) of the rail vehicle (1) and a mass (m) of a collision object (11), as indicated in step 710.

Next, the collision force measurement signal (5) and a rail vehicle speed signal (6) are supplied to an evaluation device (7), as indicated in step 720.

The collision force measurement signal (5) is integrated via an integrator (13) located in the evaluation device (7) and the mass (m) of the collision object (11) is now determined using the rail vehicle speed signal (6), as indicated in step 730.

While there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A device for detecting obstacles for a rail vehicle, comprising:
a force measuring device for producing a time-dependent collision force measurement signal in an event of a collision between a collision beam of the rail vehicle and a mass of a collision object which is accelerated to at least a speed of the rail vehicle;
an evaluation device having an integrator which over a duration of the collision integrates within integration limits comprising a start time and an end time of the collision; and
a control device which compares the mass of the collision object with a predefined threshold value and which one of (i) generates an indication to a driver when the mass of the collision object is less than the predefined threshold value and (ii) initiates a braking action when the mass of the collision object is greater than the predefined threshold value;
wherein the time-dependent collision force measurement signal and a rail vehicle speed signal are supplied to the evaluation device; and
wherein the evaluation device is configured to integrate the time-dependent collision force measurement signal over the duration of the collision via the integrator based on the start time and the end time of the collision and to determine the mass of the collision object based on the rail vehicle speed signal.

2. The device as claimed in claim 1, wherein the integration of the time-dependent collision force measurement signal is a time-limited integration or a time-unlimited integration.

3. The device as claimed in claim 2, wherein the integrator performing the integration is a block integrator.

4. The device as claimed in claim 3, wherein the force measuring device includes at least one sensor which is disposed in a collision force flow between the collision beam and an axle box of the rail vehicle.

5. The device as claimed in claim 3, wherein the force measuring device includes at least one sensor which is disposed in the collision force flow between the collision beam and a frame of a truck or a chassis frame of the rail vehicle.

6. The device as claimed in claim 3, wherein the block integrator comprises a FIR filter or an IIR filter.

7. The device as claimed in claim 2, wherein the force measuring device includes at least one sensor which is disposed in a collision force flow between the collision beam and an axle box of the rail vehicle.

8. The device as claimed in claim 2, wherein the force measuring device includes at least one sensor which is disposed in the collision force flow between the collision beam and a frame of a truck or a chassis frame of the rail vehicle.

9. The device as claimed in claim 1, wherein the force measuring device includes at least one sensor which is disposed in a collision force flow between the collision beam and an axle box of the rail vehicle.

10. The device as claimed in claim 1, wherein the force measuring device includes at least one sensor which is disposed in the collision force flow between the collision beam and a frame of a truck or a chassis frame of the rail vehicle.

11. A method for detecting obstacles for a rail vehicle, comprising:
measuring a time-dependent collision force measurement signal via a force measuring device in an event of a collision between a collision beam of the rail vehicle and a mass of a collision object which is accelerated to at least a speed of the rail vehicle;
supplying the time-dependent collision force measurement signal and a rail vehicle speed signal to an evaluation device having an integrator which integrates over a duration of the collision within integration limits comprising a start time and an end time of the collision;
integrating the time-dependent collision force measurement signal over the duration of the collision via the integrator located in the evaluation device based on the start time and the end time of the collision and determining the mass of the collision object using the rail vehicle speed signal; and
comparing the mass of the collision object with a predefined threshold value and one of (i) generating an indication to a driver when the mass of the collision object is less than the predefined threshold value and (ii) initiating a braking action when the mass of the collision object is greater than the predefined threshold value.

12. The method as claimed in claim 11, wherein the time-dependent collision force measurement signal is integrated in a time-limited or time-unlimited manner.

13. The method as claimed in claim 11, wherein the integrator comprises a block integrator.

14. The method as claimed in claim 13, wherein the block integrator comprises a FIR filter or an IIR filter.

15. The method as claimed in claim 11, wherein a high-pass filter for removing the constant components and low-frequency signal components is utilized in the evaluation device.

16. The method as claimed in claim 11, wherein the force measuring device comprises at least one sensor which is disposed in the collision force flow between the collision beam and an axle box of a truck of the rail vehicle.

17. The method as claimed in claim 11, wherein the force measuring device comprises at least one sensor which is disposed in the collision force flow between the collision beam and a frame of a truck of the rail vehicle.

18. The method as claimed in claim 11, wherein the determination of the mass is performed via a conservation of linear momentum for a rail vehicle speed signal, a signal value of which is greater than a predefinable speed threshold value.

19. The method as claimed in claim 11, wherein, below a predefinable speed threshold value, the mass is determined via a sliding frictional force.

20. A non-transitory computer program product encoded with a command sequence, which when executed by an evaluation device, causes detection of obstacles for a rail vehicle, the command sequence comprising:

program code for measuring a time-dependent collision force measurement signal is via a force measuring device in an event of a collision between a collision beam of the rail vehicle and a mass of a collision object which is accelerated to at least a speed of the rail vehicle;

program code for supplying the time-dependent collision force measurement signal and a rail vehicle speed signal to an evaluation device having an integrator which integrates over a duration of the collision within integration limits comprising a start time and an end time of the collision;

program code for integrating the time-dependent collision force measurement signal over the duration of the collision via the integrator located in the evaluation device based on the start time and the end time of the collision and determining the mass of the collision object using the rail vehicle speed signal; and program code for comparing the mass of the collision object with a predefined threshold value and one of (i) generating an indication to a driver when the mass of the collision object is less than the predefined threshold value and (ii) initiating a braking action when the mass of the collision object is greater than the predefined threshold value.

* * * * *